(12) United States Patent
Kitagawa et al.

(10) Patent No.: US 11,829,113 B2
(45) Date of Patent: Nov. 28, 2023

(54) INFORMATION PROCESSING DEVICE FOR OPTIMIZING FILTERS THAT PURIFY WASTEWATER

(71) Applicant: WOTA CORP., Tokyo (JP)

(72) Inventors: Riki Kitagawa, Tokyo (JP); Shohei Okudera, Tokyo (JP); Manabu Nishio, Tokyo (JP); Ryo Yamada, Tokyo (JP)

(73) Assignee: WOTA CORP., Tokyo (JP)

( * ) Notice: Subject to any disclaimer, the term of this patent is extended or adjusted under 35 U.S.C. 154(b) by 0 days.

(21) Appl. No.: 16/649,091

(22) PCT Filed: Sep. 20, 2018

(86) PCT No.: PCT/JP2018/034910
§ 371 (c)(1),
(2) Date: Mar. 19, 2020

(87) PCT Pub. No.: WO2019/059310
PCT Pub. Date: Mar. 28, 2019

(65) Prior Publication Data
US 2021/0063981 A1    Mar. 4, 2021

(30) Foreign Application Priority Data

Sep. 20, 2017   (JP) .................................. 2017-180581
Sep. 20, 2017   (JP) .................................. 2017-180582

(51) Int. Cl.
G05B 19/042        (2006.01)

(52) U.S. Cl.
CPC .... *G05B 19/042* (2013.01); *G05B 2219/2605* (2013.01)

(58) Field of Classification Search
CPC ................ G05B 19/042; G05B 2219/2605
See application file for complete search history.

(56) References Cited

U.S. PATENT DOCUMENTS 5,858,215 A * 1/1999 Burchard ............... C02F 1/003
                                                        137/551
8,918,217 B2 * 12/2014 Subbiah ................. C02F 1/441
                                                        700/271
(Continued)

FOREIGN PATENT DOCUMENTS

BR        102015029206 A2 * 5/2017
EP            3 162 769 A1    5/2017
(Continued)

OTHER PUBLICATIONS

Ichihara, Water purifier, water purifier system, water purifier management system, and water purifier usage status detection method, 2017, google patents, pp. 1-20 (Year: 2017).*

(Continued)

*Primary Examiner* — Christopher E. Everett
*Assistant Examiner* — Yvonne Trang Follansbee
(74) *Attorney, Agent, or Firm* — Studebaker & Brackett PC

(57) ABSTRACT

The problem addressed by the present invention is to suitably generate or update an algorithm for a water treatment system. In a filter management server 1 for managing a water circulation management system W for treating wastewater using one or more filters 31, an acquisition unit 101 acquires information necessary for analyzing filter 31 performance or sample water DW. An analytical unit 102 analyzes the one or more filters 31 on the basis of the information acquired by the acquisition unit 101. An analysis results analytical unit 104 analyzes the one or more filters 31 or sample water DW on the basis of the results of the analysis by the analytical unit 102. An update unit 105 updates the algorithm for water treatment on the basis of the results of the analysis by the analysis results analytical unit 104. This configuration solves the aforementioned problem.

16 Claims, 13 Drawing Sheets

(56) References Cited

U.S. PATENT DOCUMENTS

| | | | |
|---|---|---|---|
| 10,210,217 B2* | 2/2019 | Yoshitake | G06F 16/35 |
| 2010/0106265 A1* | 4/2010 | Ebrom | H04L 67/12 |
| | | | 700/90 |
| 2010/0161082 A1* | 6/2010 | Ebrom | H04L 67/12 |
| | | | 700/17 |
| 2011/0307160 A1 | 12/2011 | Verdegan et al. | |
| 2013/0226627 A1 | 8/2013 | Kubovcik et al. | |
| 2016/0053425 A1* | 2/2016 | Wolff | B01D 65/02 |
| | | | 210/650 |
| 2019/0031530 A1 | 1/2019 | Kitagawa et al. | |

FOREIGN PATENT DOCUMENTS

| | | | | |
|---|---|---|---|---|
| JP | H09-313822 A | | 12/1997 | |
| JP | 2002-102615 A | | 4/2002 | |
| JP | 2004-283755 A | | 10/2004 | |
| JP | 2008136974 A | * | 6/2008 | |
| JP | 2016-096421 A | | 5/2016 | |
| JP | 2017047303 A | * | 3/2017 | C02F 1/00 |
| TW | 201412975 A | * | 4/2014 | |
| WO | WO-2006087735 A1 | * | 8/2006 | D06F 33/32 |
| WO | 2017/155124 A1 | | 9/2017 | |
| WO | 2018/124291 A1 | | 7/2018 | |

OTHER PUBLICATIONS

Nag, An appliance to provide an optimum washing and drying with minimum external inputs, 2006, google patents, 1-10 (Year: 2006).*

Manabe, Water treatment system, 2006, google patents, machine translation of JP 2008136974 (Year: 2006).*

Liao, Cleaner and cleaning apparatus of filter, 2014, google patents, machine translation of TW201412975 (Year: 2014).*

Claudio, instant water and energy recycling and wastewater reuse system, 2017, google patents, machine translation of BR102015029206 (Year: 2017).*

International Search Report issued in PCT/JP2018/034910; dated Nov. 20, 2018.

Ding Qisheng et al., "New Utility Filter Technology 3rd Edition", Beijing Metallurgical Industry Press, Jun. 2011, p. 725. The English translation of the Chinese Office Action as a concise explanation of the relevance is submitted herewith.

An Office Action mailed by China National Intellectual Property Administration dated Sep. 17, 2021, which corresponds to Chinese Patent Application No. 201880060758.0 and is related to U.S. Appl. No. 16/649,091; with English language translation.

* cited by examiner

INFORMATION PROCESSING DEVICE FOR OPTIMIZING FILTERS THAT PURIFY WASTEWATER

TECHNICAL FIELD

The present invention relates to an information processing device.

BACKGROUND ART

Conventionally, there has been proposed a cartridge filter type hot water circulation purifying device in which the deformation of a filter housing is suppressed even if the pressure in the hot water passage becomes negative when a circulation pump is operated (Patent Document 1).
Patent Document 1: Japanese Unexamined Patent Application, Publication No. H09-313822

DISCLOSURE OF THE INVENTION

Problems to be Solved by the Invention

However, in the conventional techniques including the technique described in the above Patent Document 1, it is assumed that the cartridge filter is disposable. Therefore, there has been no idea of generating or updating an algorithm for a water treatment system by collecting and analyzing filters used in the water treatment system.

The present invention has been made in view of such a situation, and it is an object of the present invention to appropriately generate or update an algorithm for a water treatment system.

Means for Solving the Problems

In order to achieve the aforementioned object, an information processing device according to an aspect of the present invention is an information processing device for managing a water treatment system for treating drainage water using one or more filters, and the information processing device includes: an acquisition unit for acquiring information necessary for analysis of performance of the one or more filters or collected water; an analysis unit for analyzing the one or more filters based on the information acquired by the acquisition unit; a first analysis unit for analyzing the performance of the one or more filters or the collected water based on an analysis result of the analysis unit; and an update unit for updating an algorithm relevant to the water treatment based on an analysis result of the first analysis unit.

Effects of the Invention

According to the present invention, it is possible to appropriately generate or update an algorithm for a water treatment system.

PREFERRED MODE FOR CARRYING OUT THE INVENTION

Hereinafter, embodiments of the present invention will be described with reference to the diagrams.

[System Configuration]

Figure 1:
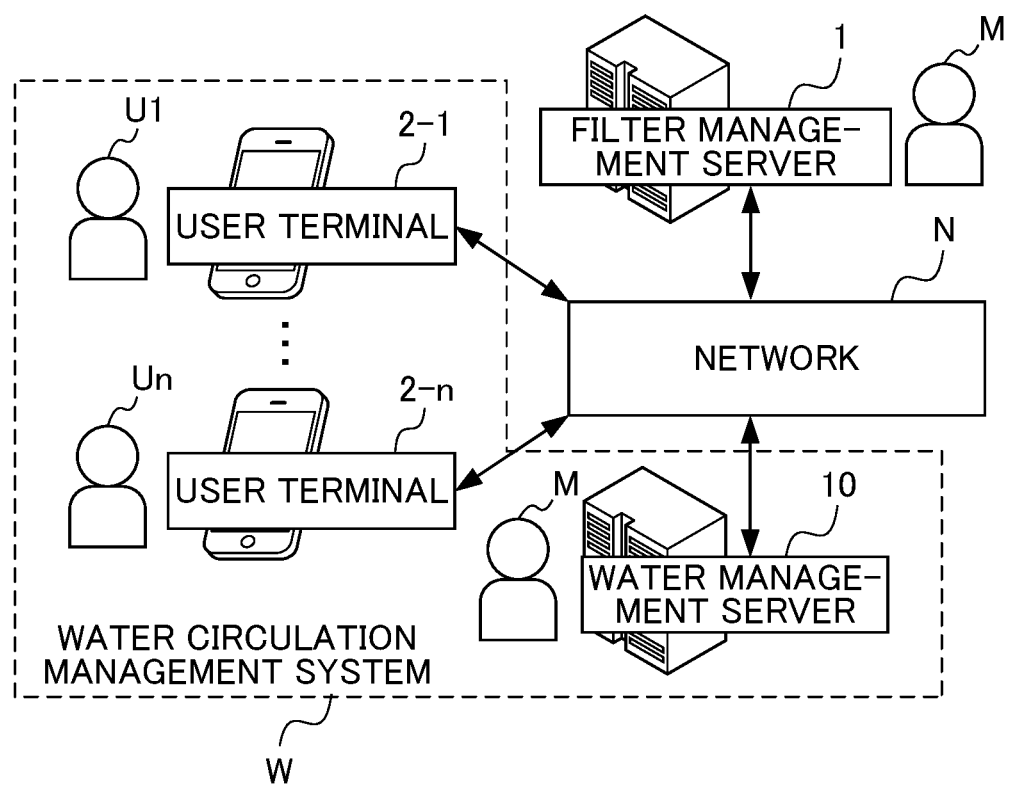
FIG. 1 is a diagram illustrating the configuration of an information processing system including a filter management server that is an embodiment of an information processing device of the present invention.

FIG. 1 is a diagram illustrating the configuration of an information processing system including a filter management server 1 that is an embodiment of an information processing device of the present invention.

In the information processing system illustrated in FIG. 1, the filter management server 1 and a water management server 10 and user terminals 2-1 to 2-$n$ ($n$ is an arbitrary integer of 1 or more), which are included in a water circulation management system W, are connected to each other through a predetermined network N, such as the Internet.

The filter management server 1 is a server managed by a service provider M, and manages each operation of the user terminals 2-1 to 2-$n$. The filter management server 1 performs management, such as replacement of a filter 31 used in a water treatment device 3 of the water circulation management system W. The water management server 10 is a server that manages the water circulation management system W. The user terminals 2-1 to 2-$n$ are information processing devices operated by users U1 to Un using the water circulation management system W. Each of the user terminals 2-1 to 2-$n$ is a smartphone, a tablet terminal, or the like. In addition, hereinafter, when it is not necessary to distinguish the user terminals 2-1 to 2-$n$ and the users U1 to Un, these are collectively referred to as "user terminal 2" and "user U", respectively.

Figure 2:
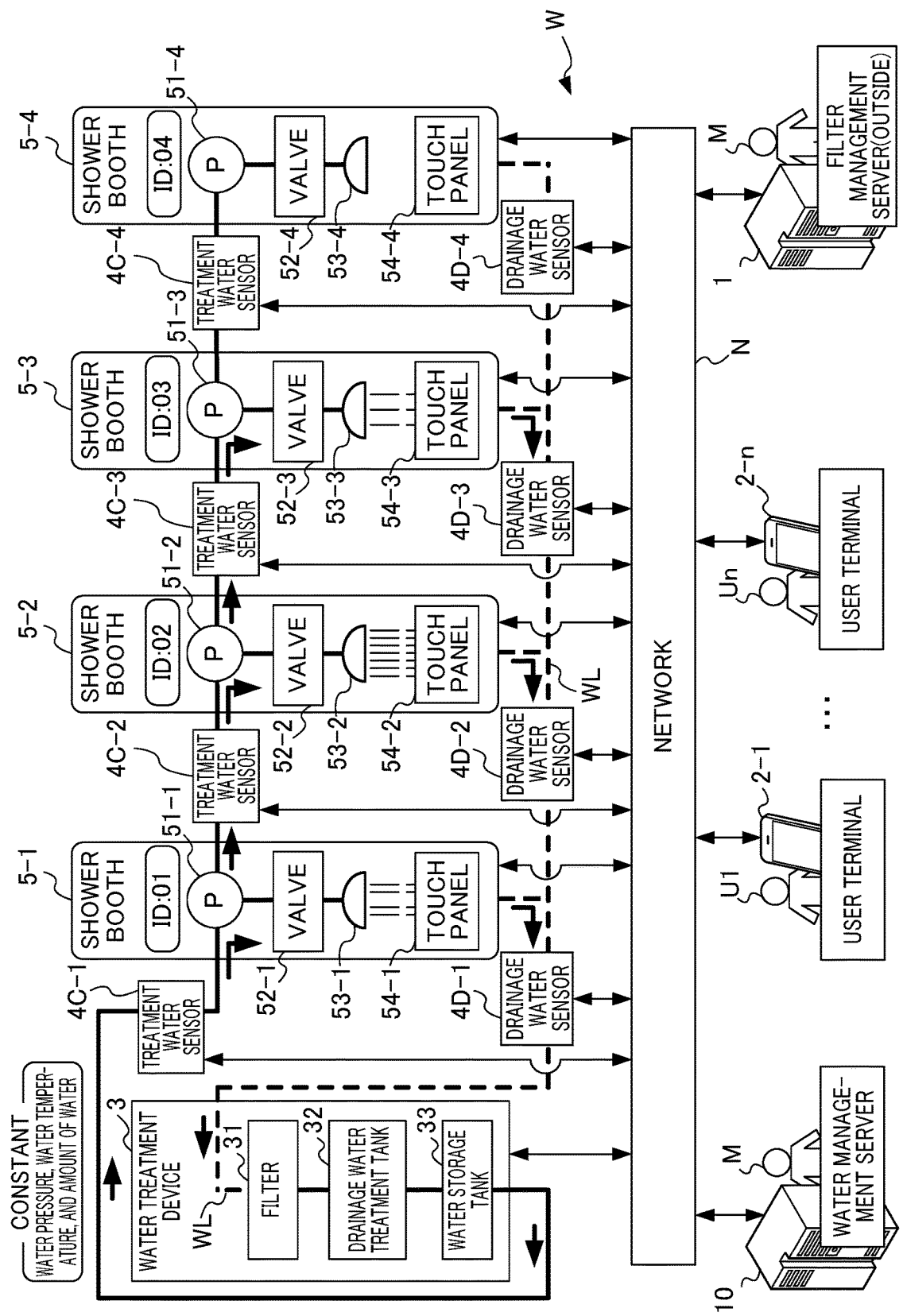
FIG. 2 is an image diagram illustrating the configuration of a water circulation management system.

Next, the configuration of the water circulation management system W, in which the filter 31 managed by the filter management server 1 that is an embodiment of the information processing device of the present invention is adopted as a purification unit for purifying drainage water, will be described. FIG. 2 is an image diagram illustrating the configuration of the water circulation management system W.

The water circulation management system W illustrated in FIG. 2 includes the water management server 10, the user terminals 2-1 to 2n, the water treatment device 3, treated water sensors 4C-1 to 4C-4, drainage water sensors 4D-1 to 4D-4, and shower booths 5-1 to 5-4. In addition, the filter management server 1 is connected to the network N as an external server of the water circulation management system W. The water management server 10, the user terminals 2-1 to 2n, the water treatment device 3, the treated water sensors 4C-1 to 4C-4, the drainage water sensors 4D-1 to 4D-4, and the shower booths 5-1 to 5-4 are connected to each other through a network N, such as the Internet.

The water circulation management system W has a configuration in which a plurality of shower booths 5-1 to 5-4 are connected to the water treatment device 3 in series, in parallel, or in a combination of series and parallel by piping in a water passage WL. In addition, in the water passage WL, a solid line indicates a water passage through which treated water flows, and a broken line indicates a water passage through which drainage water flows. The water management server 10 detects the use status of each of the shower booths 5-1 to 5-4 based on sensing data obtained by the sensing of each of the treated water sensors 4C-1 to 4C-4 and the drainage water sensors 4D-1 to 4D-4 attached to the water passage WL or a valve 52 described later.

When it is not necessary to individually distinguish the treated water sensors 4C-1 to 4C-4, these are collectively referred to as "treated water sensor 4C". In addition, when it is not necessary to individually distinguish the drainage water sensors 4D-1 to 4D-4, these are collectively referred to as "drainage water sensor 4D". When it is not necessary to individually distinguish the shower booths 5-1 to 5-4, these are collectively referred to as "shower booth 5". Hereinafter, each element configuring the water circulation management system W will be described.

(Water Management Server)

The water management server 10 is a server that manages the water circulation management system W, and controls the input of treated water to each of one or more utilization units based on sensing data obtained by sensing of a sensing unit. Specifically, the water management server 10 controls the input of treated water to each of the shower booths 5-1 to 5-4 based on the sensing data obtained by the sensing the treated water sensors 4C-1 to 4C-4 and the drainage water sensors 4D-1 to 4D-4.

In addition, based on the sensing data, the water management server 10 generates information (hereinafter, referred to as "water use information") including at least one or more of information regarding treated water, such as use start, use stop, and use amount at the one or more utilization units, and use time of treated water, and various kinds of information regarding drainage water, such as drainage start, drainage stop, drainage amount, and water pollution degree of drainage water. Specifically, the water management server 10 generates water use information in the shower booths 5-1 to 5-4 based on the sensing data.

In addition, based on the sensing data, the water management server 10 generates information (hereinafter, referred to as "user use information") including at least one of the use status of a user U using each of one or more utilization units and the time taken for a user U trying to use each of the one or more utilization units to be able to use the utilization unit. Specifically, based on the sensing data, the water management server 10 generates user use information including at least one of the use status of the user U using each of the shower booths 5-1 to 5-4 and the time taken for the user U trying to use each of the shower booths 5-1 to 5-4 to be able to use the shower booth 5. Here, as information regarding the user U, the use status of the user U includes gender, age, weight, and height of the user U, information regarding a detergent (a body soap, a shampoo, and the like) used by the user U, and information such as a timing at which a detergent is used and preferences when using a detergent (such as using a shampoo twice).

(Water Treatment Device)

The water treatment device 3 is configured to include the filter 31, a drainage water treatment tank 32, and a water storage tank 33. The water treatment device 3 treats drainage water output from the shower booth 5 using the filter 31, thereby producing treated water that can be reused in the shower booth 5.

Although not illustrated, the filter 31 includes one or more filters 31-1 to 31-m (m is an arbitrary integer of 1 or more). That is, the filter 31 is configured to include at least one or more of a strainer, a thread-wound type filter, a sediment filter, an ultra filtration membrane type filter (hereinafter, referred to as a "UF filter"), a microfiltration filter, a reverse osmosis membrane type filter (hereinafter, referred to as an "RO filter"), a forward osmosis filter, an ion exchange filter, biological treatment, an activated carbon filter, a nano filter (NF), sand filtration, a ceramic filter, a centrifugal filter, and the like.

A drainage water treatment tank 32 is configured to include an intermediate tank and a concentration tank. The intermediate tank temporarily stores water that has passed through some of the filters 31 and purifies the water. Concentrated water produced by the purification is temporarily stored in a concentration tank, and is discarded when maintenance is performed. As described above, by providing the intermediate tank and purifying the water, the wear of the filter 31 is reduced. As a result, the life of the filter 31 can be extended. In addition, by temporarily storing water in the intermediate tank, the total organic carbon (TOC) and total nitrogen (TN) of the water can be estimated. Therefore, the cost for water analysis can be reduced. A water storage tank 33 is a tank for storing the produced treated water. The treated water stored in the water storage tank 33 is output to the shower booth 5.

(Treated Water Sensor)

The treated water sensor 4C senses treated water input to each of the one or more utilization units. Specifically, the treated water sensor 4C senses treated water input to each of the shower booths 5-1 to 5-4.

(Drainage Water Sensor)

The drainage water sensor 4D senses drainage water output from each of the one or more utilization units. Specifically, the drainage water sensor 4D senses drainage water output from each of the shower booths 5-1 to 5-4.

The treated water sensor 4C and the drainage water sensor 4D are at least one or more sensors capable of detecting water pressure, flow rate, pH, viscosity, turbidity, chromaticity, odor, total organic carbon, total inorganic carbon, total carbon, nitrate nitrogen, nitrite nitrogen, ammonia nitrogen, total nitrogen, residual chlorine, total phosphorus, electrical conductivity, and temperature.

(Shower Booth)

The shower booth 5 is a booth including a shower used by the user U, and includes a pump 51, the valve 52, a shower head 53, the touch panel 54, and a drain pan (not illustrated).

The use conditions can be set for men, women, children, pets, and the like according to the type of the user U who uses the shower booth 5.

The pump 51 inputs at least a part of the produced treated water to the shower head 53 through the valve 52. In addition, the pump 51 sends out at least a part of the produced treated water to the pump 51 provided in another shower booth 5. Specifically, for example, as illustrated in FIG. 1, the pump 51-1 inputs at least a part of the treated water produced by the water treatment device 3 to the shower head 53-1 through the valve 52-1. In addition, the pump 51-1 sends out at least a part of the treated water produced by the water treatment device 3 to the pump 51-2 provided in the shower booth 5-2. The pumps 51-1 to 51-4 are positive displacement pumps, non-positive displacement pumps, water mallet pumps, bubble pumps, injection pumps, or submersible pumps.

The valve 52 is a valve for the user U using the shower booth 5 to perform an operation of adjusting the pressure of treated water sprinkled from the shower head 53. The shower head 53 is a shower head for sprinkling the treated water input by the pump 51. The touch panel 54 is a touch panel attached to the outer wall of the shower booth 5, and displays water use information and user use information. In addition, the touch panel 54 receives an input operation of the user U trying to use the shower booth 5.

[Hardware Configuration]

Figure 3:
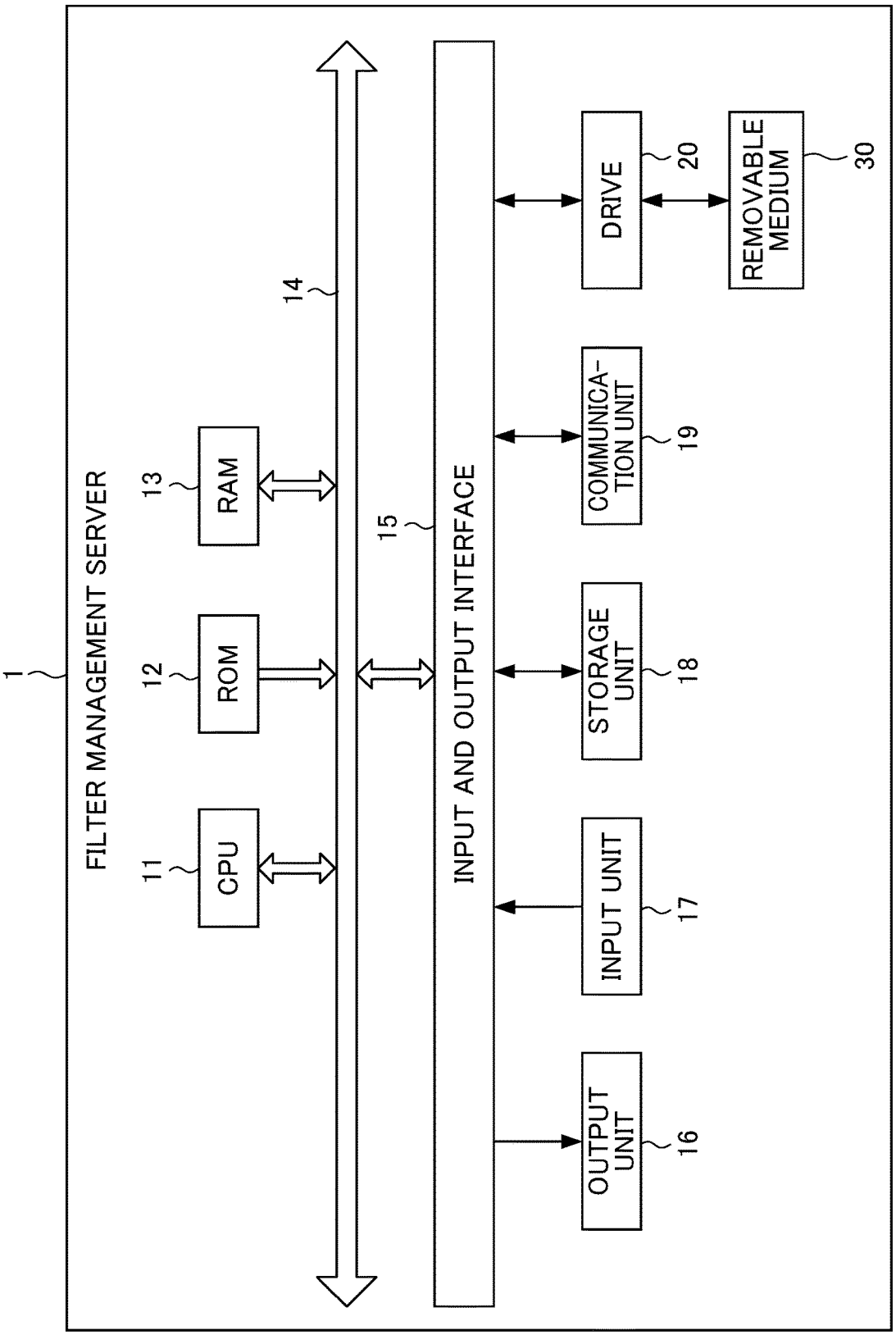
FIG. 3 is a block diagram illustrating an example of the hardware configuration of the filter management server in the information processing system illustrated in FIG. 1.

FIG. 3 is a block diagram illustrating an example of the hardware configuration of the filter management server 1 in the information processing system illustrated in FIG. 1.

The filter management server 1 includes a central processing unit (CPU) 11, a read only memory (ROM) 12, a random access memory (RAM) 13, a bus 14, an input and output interface 15, an output unit 16, an input unit 17, a storage unit 18, a communication unit 19, and a drive 20.

The CPU 11 executes various processes according to a program recorded in the ROM 12 or a program loaded from the storage unit 18 to the RAM 13. The RAM 13 also appropriately stores data and the like necessary for the CPU 11 to execute various processes.

The CPU 11, the ROM 12, and the RAM 13 are connected to each other through a bus 14. The bus 14 is also connected to the input and output interface 15. The output unit 16, the input unit 17, the storage unit 18, the communication unit 19, and the drive 20 are connected to the input and output interface 15.

The output unit 16 is a liquid crystal display or the like, and displays various images. The input unit 17 is configured to include various hardware buttons and the like, and inputs various kinds of information in accordance with an instruction operation of an operator.

The storage unit 18 is a dynamic random access memory (DRAM) or the like, and stores various kinds of data. The communication unit 19 controls communication with other devices (for example, the user terminal 2 and the water management server 10) through the network N including the Internet.

The drive 20 is provided as necessary. A removable medium 30, such as a magnetic disk, an optical disc, a magneto-optical disc, and a semiconductor memory, is appropriately mounted on the drive 20. A program read from the removable medium 30 by the drive 20 is installed on the storage unit 18 as necessary. In addition, the removable medium 30 can store various kinds of data stored in the storage unit 18 in the same manner as the storage unit 18.

By the cooperation of various kinds of hardware and various kinds of software of the filter management server 1 illustrated in FIG. 3, it is possible to execute various processes described later. In addition, although not illustrated, the user terminal 2 and the water management server 10 in the information processing system illustrated in FIG. 1 also have the hardware configuration illustrated in FIG. 3. Here, the user terminal 2 has a touch panel as the output unit 16 and the input unit 17.

[Functional Configuration]

Figure 4:
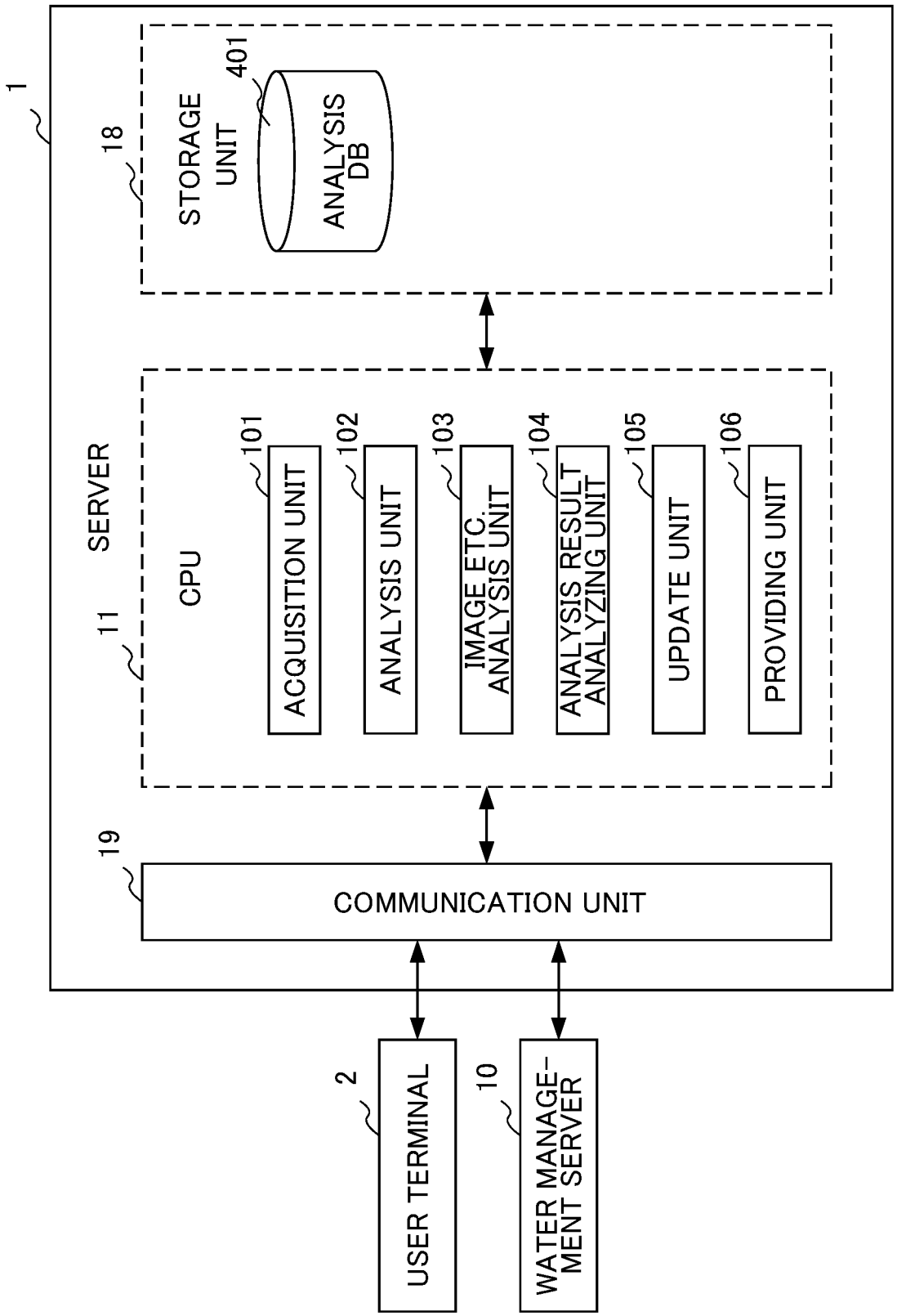
FIG. 4 is a functional block diagram illustrating an example of the functional configuration for realizing algorithm update processing and incentive providing processing in the functional configuration of the filter management server illustrated in FIG. 3.

FIG. 4 is a functional block diagram illustrating an example of the functional configuration for realizing algorithm update processing and incentive providing processing in the functional configuration of the filter management server 1 illustrated in FIG. 3.

"Algorithm update processing" refers to processing for updating an algorithm for operating the water treatment device 3 based on the result of data analysis. "Incentive providing processing" refers to processing for providing an incentive to the user U who has replaced the filter 31 or the user U who has provided various kinds of information.

As illustrated in FIG. 4, in a CPU 11 of the filter management server 1, when the algorithm update processing is performed, an acquisition unit 101, an analysis unit 102, an image etc. analysis unit 103, an analysis result analyzing unit 104, and an update unit 105 function. In addition, when the incentive providing processing is performed, the acquisition unit 101, the analysis unit 102, the image etc. analysis unit 103, the analysis result analyzing unit 104, and a providing unit 106 function. In addition, an analysis DB 401 is provided in one area of the storage unit 18.

The acquisition unit 101 acquires various kinds of information including information necessary for analyzing the performance of the filter 31 that purifies drainage water by making the drainage water pass therethrough. The analysis unit 102 analyzes the filter 31 based on the information acquired by the acquisition unit 101. The analysis result of the analysis unit 102 is stored and managed in the analysis DB 401 as analysis data to be analyzed by the image etc. analysis unit. The image etc. analysis unit 103 analyzes images and sentences based on the information acquired by the acquisition unit 101. The analysis result analyzing unit 104 analyzes the analysis result of the analysis unit 102. In addition, the analysis result analyzing unit 104 analyzes the analysis result of the image etc. analysis unit 103. The analysis result of the analysis result analyzing unit 104 is stored and managed in the analysis DB 401. The update unit 105 updates an algorithm for operating the water treatment device 3 based on the analysis result of the analysis result analyzing unit 104. The providing unit 106 provides an incentive to the user U based on the analysis result of the analysis result analyzing unit 104.

The analysis result of the analysis result analyzing unit 104 is stored and managed in the analysis DB 401.

[Service Contents]

(Filter Management Service)

Figure 5:
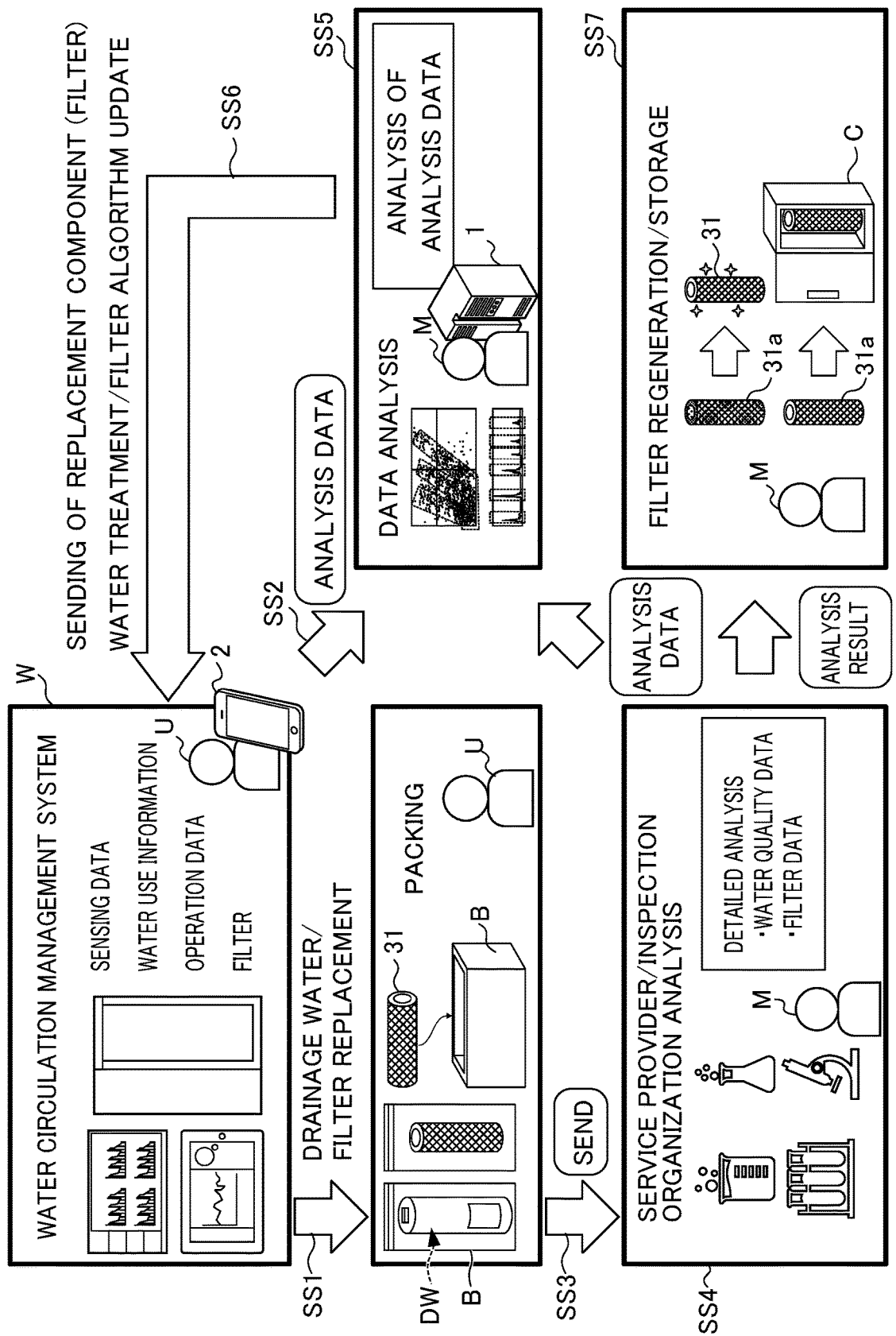
FIG. 5 is an image diagram illustrating the content of the filter management service.

Next, referring to FIG. 5 and appropriately referring to FIG. 2 illustrating the water circulation management system W, a filter management service that can be provided by processing executed by the filter management server 1 according to an embodiment of the information processing device of the present invention will be described. FIG. 5 is an image diagram illustrating the content of the filter management service.

As illustrated in FIG. 5, in step SS1, the user U removes a used filter 31a from the water treatment device 3 (FIG. 2), and collects water present in a place where water is used, a place where water is discharged, or inside the water treatment device 3. Specifically, for example, water is collected at all timings, such as the timing at which treated water is input to the shower booth 5 (FIG. 2), the timing at which treated water is sprinkled from the shower head 53, and the timing at which drainage water is output from the shower booth 5. Hereinafter, the collected water is referred to as "sample water" DW. By collecting the sample water DW, data obtained by analyzing the sample water DW can be compared with various kinds of data separately output from the water circulation management system W. In addition, by making water different from the collected sample water DW pass through the used filter 31a, it is possible to compare the influence of the difference of water passing through the used filter 31a on the water treatment.

In step SS2, the user U (FIG. 1) transmits data necessary for analysis of the use status of the water treatment device 3 including analysis of the used filter 31a (hereinafter, referred to as "analysis data"), which is output from the water circulation management system W, to the service provider M (FIG. 1). Specifically, the user U transmits the analysis data to the filter management server 1 by operating the user terminal 2. The analysis data transmitted to the filter management server 1 includes the following three kinds of data. That is, data relevant to water quality (hereinafter, referred to as "water quality data"), data indicating the operation state of the water treatment device 3 (hereinafter, referred to as "operation data"), and data relevant to the filter 31 (hereinafter, referred to as "filter data") are included. The water quality data includes data indicating the quality of treated water produced as a result of the drainage water treatment of the water treatment device 3, data indicating the quality of treated water in the water storage tank 33, data indicating the quality of drainage water output from the shower booth 5, and the like. The operation data includes data indicating the operation state of pumps 51-1 to 51-4 (FIG. 2), data indicating whether appropriate maintenance is being performed, data indicating the amount of water in the drainage water treatment tank 32 (FIG. 2) and the water storage tank 33 (FIG. 2), data indicating an environment in which the water treatment device 3 is placed, and the like. The filter data includes data indicating the type of the filter 31, data indicating the degree of wear of the filter 31 (FIG. 2), and the like. The filter data is managed for each filter 31 using an IC tag or an identifier, such as a QR code (registered trademark) attached to the filter 31.

In step SS3, the user U packs the used filter 31a and the collected sample water DW into a transport pack B, and sends the transport pack B to the service provider M. Specifically, the used filter 31a is sent to the service provider M while maintaining the condition at the time of replacement.

In step SS4, the service provider M analyzes the used filter 31a sent from the user U, analyzes the quality of the sampled drainage water, and analyzes the cause of wear of the used filter 31a. In addition, these analyses may be performed by the service provider M by themselves, or may be performed by an inspection and analysis organization requested by the service provider M. Detailed data of the used filter 31a obtained by the analysis is used as analysis data in an analysis in step SS5 described later.

In step SS5, the service provider M analyzes the analysis data. Specifically, analysis of water quality data, analysis of operation data, and analysis of filter data are included.

In step SS6, the service provider M selects a suitable filter 31 to be mounted in the water treatment device 3 based on the analysis result, and sends the selected filter 31 to the user U. In addition, the service provider M feeds back the analysis result to the water treatment device 3. Specifically, the service provider M updates an algorithm for operating the water treatment device 3 by inputting the analysis result to the water management server 10 (FIG. 1). Therefore, it is possible to realize efficient drainage water treatment. In addition, an image of feedback by the filter management server 1 will be described later with reference to FIG. 6.

In step SS7, the service provider M regenerates the used filter 31a as the filter 31, which can be mounted in the water treatment device 3, based on the analysis result in step SS4 and the analysis result in step SS5. Specifically, among the used filters 31a, for the used filter 31a determined that a level of wear that requires regeneration processing is recognized, regeneration processing using chemicals or regeneration processing using a physical method is performed.

The user U can request the service provider M to store the used filter 31a. The service provider M that has received the storage request from the user U stores and manages the used filter 31a, which is a storage target, in a storage case C. Specifically, the service provider M stores the used filter 31a as a storage target in an environment suitable for storing the used filter 31a based on the analysis result in step SS4 and the analysis result in step SS5. In addition, as the environment suitable for storing the used filter 31a, for example, storage using chemicals and storage under a special environment can be mentioned.

Figure 6:
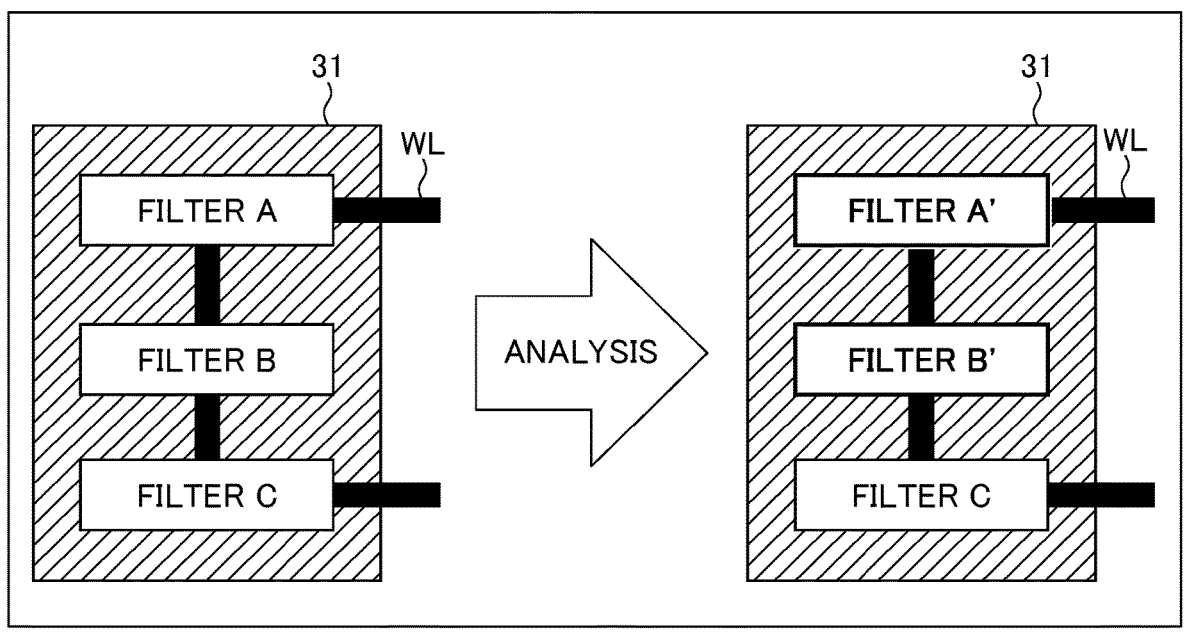
FIG. 6 is an image diagram of feedback by the filter management server in step SS6 of FIG. 5.

FIG. 6 is an image diagram of feedback by the filter management server 1 in step SS6 of FIG. 5.

As illustrated in FIG. 6, the configuration of the filter 31 of the water treatment device 3 is changed before and after filter replacement. That is, the filter 31 before filter replacement has a configuration including a filter A, a filter B, and a filter C, but the filter 31 after filter replacement has a configuration including a filter A', a filter B', and a filter C. This is because the result obtained by the analysis at the time of filter replacement is fed back and the configuration of the filter is changed to a more suitable one. Therefore, it is possible to realize efficient drainage water treatment.

(Filter Replacement Promotion Service)

Figure 7:
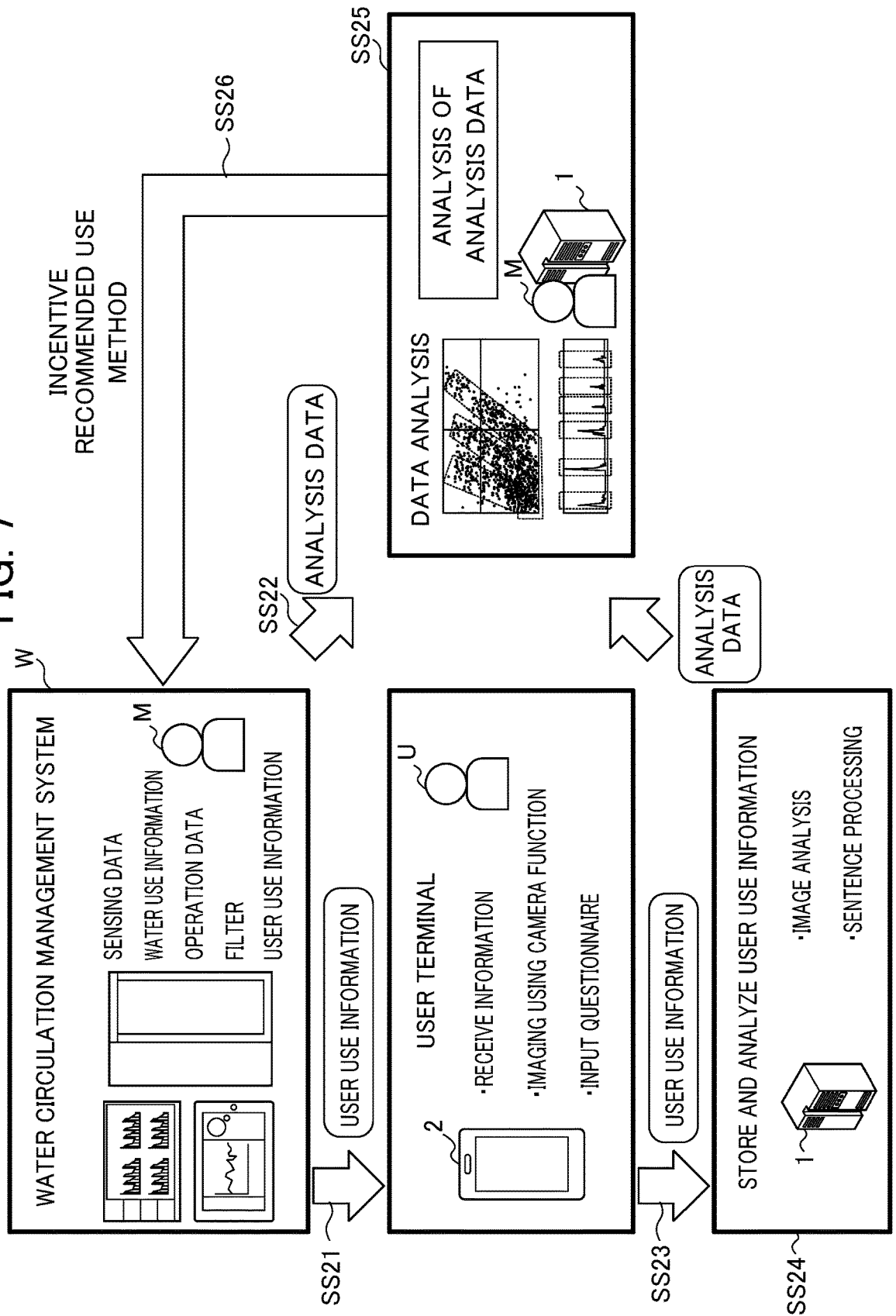
FIG. 7 is an image diagram illustrating the content of a filter replacement promotion service.

Next, referring to FIG. 7 and appropriately referring to FIG. 2 illustrating the water circulation management system W, a filter replacement promotion service that can be realized by various kinds of processing executed by the filter management server 1 according to an embodiment of the information processing device of the present invention will be described. FIG. 7 is an image diagram illustrating the content of the filter replacement promotion service.

The "filter replacement promotion service" is a service for promoting the replacement of the filter 31, which is used for purifying drainage water in the water circulation management system W, and the provision of various kinds of information for the user U of the water circulation management system W illustrated in FIG. 2. The drainage water treatment function of the water circulation management system W largely depends on the purification function of the filter 31. Therefore, in order for the user U to continue using the water treated by the water circulation management system W comfortably, it is necessary to maintain a state in which the purification function of the filter 31 is sufficiently realized. For that purpose, the filter 31 is to be periodically replaced. Here, in order to periodically replace the filter 31, the user U needs to have a positive intention to periodically replace the filter 31. However, among the users U, there are many people who do not recognize the importance of replacing the filter 31, feel troublesome to replace the filter 31, or forget to replace the filter 31. Therefore, the service provider M provides a filter replacement promotion service to all the users U including the user U. Then, the user U can receive various incentives described later only by performing a procedure of replacing the filter 31 whose replacement time has come. As a result, the user U can maintain the function of the water circulation management system W, and the service provider M can enjoy the advantage of promoting the collection of used filters.

As illustrated in FIG. 7, the specific flow of the filter replacement promotion service is as follows. In step SS21, the user U inputs the user use information managed by the water circulation management system W to the user terminal 2 by operating the user terminal 2. The specific method of inputting the user use information to the user terminal 2 is not particularly limited. For example, the user use information transmitted from the water management server 10 to the user terminal 2 may be received, or an input may be made on a questionnaire input screen (not illustrated) displayed on the user terminal 2. In addition, a captured image that is captured using a camera function of the user terminal 2 may be input. A specific example of inputting a captured image that is captured using the camera function of the user terminal 2 will be described later with reference to FIG. 8.

In step SS22, the user U (FIG. 1) transmits the analysis data to the service provider M (FIG. 1). Specifically, the user U transmits the analysis data to the filter management server 1 by operating the user terminal 2. The analysis data transmitted to the filter management server 1 includes sensing data, water use information, operation data, filter data, and user use information.

In step SS23, the user U sends information including at least the user use information to the service provider M. Specifically, the user U transmits information including at least the user use information to the filter management server 1 by operating the user terminal 2.

In step SS24, the service provider M acquires, stores, and analyzes the information including at least the user use information transmitted from the user U. Specifically, the filter management server 1 managed by the service provider M acquires, stores, and analyzes information including at least the user use information transmitted from the user terminal 2. Analysis of the information including at least the user use information is performed by image analysis or sentence processing. The detailed data regarding the used filter 31a obtained by analyzing the information including at least the user use information is used as analysis data in an analysis in step SS25 described later.

In step SS25, the service provider M analyzes the analysis data. Specifically, the filter management server 1 performs analysis of sensing data, analysis of water use information, analysis of operation data, analysis of filter data, and analysis of user use information.

In step SS26, the service provider M provides an incentive to the user U. As incentives provided to the user U, providing incentives by "objects", such as points, coupons, spares for the filter 31, and gifts, and providing incentives by "services", such as notification service of information regarding the health condition of the user U and provision of information regarding the recommended use of the water treatment device 3, are included.

Figure 8:
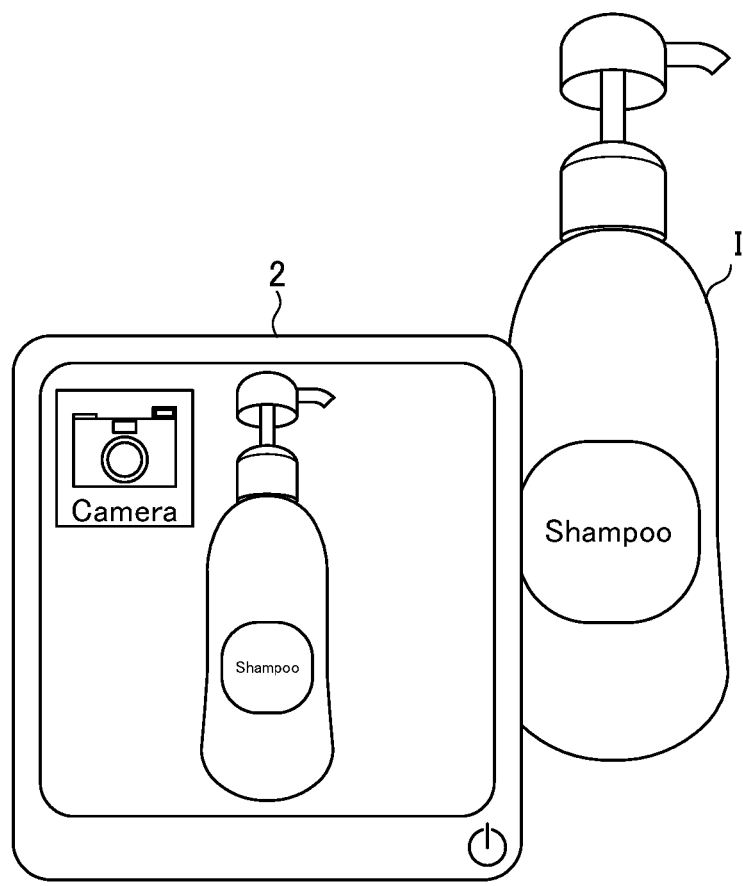
FIG. 8 illustrates how a user images a shampoo used in a shower booth using a camera function of a user terminal.
Figure 9:
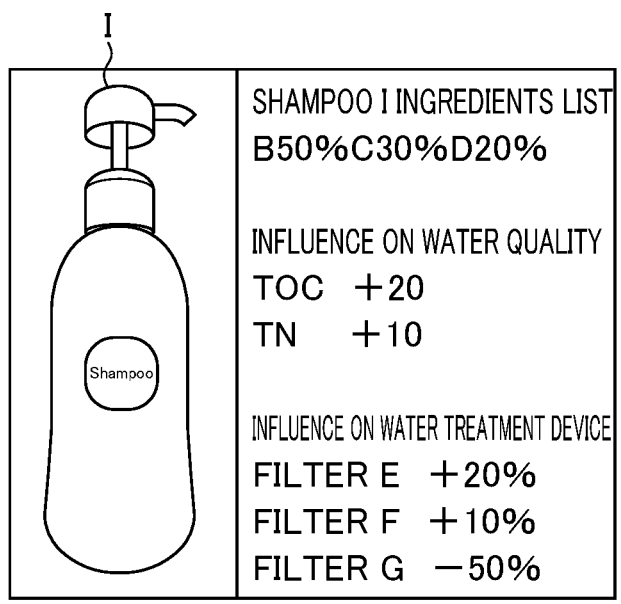
FIG. 9 is a diagram illustrating an analysis result of the filter management server.
Figure 10:
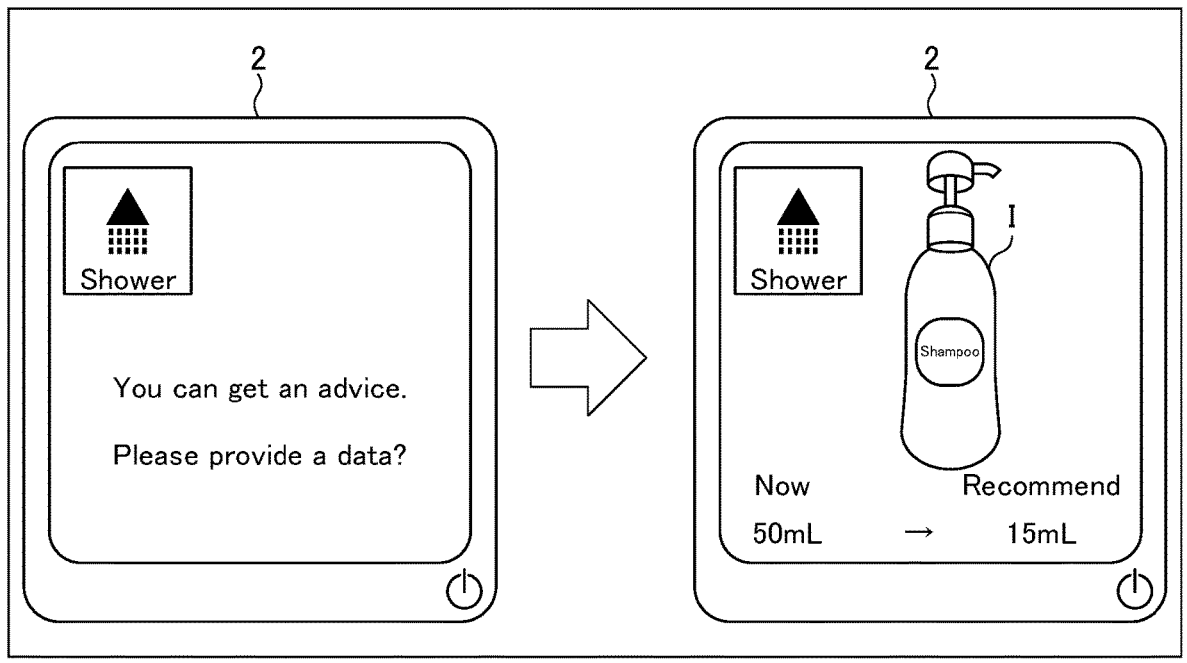
FIG. 10 is a diagram illustrating a specific example of advice from a service provider displayed on a user terminal.

FIGS. 8 to 10 are diagrams illustrating specific examples of a captured image that is captured using the camera function of the user terminal 2.

FIG. 8 illustrates how the user U images a shampoo I used in the shower booth 5 using the camera function of the user terminal 2. The captured image of the shampoo I is transmitted from the user terminal 2 to the filter management server 1. The filter management server 1 acquires the captured image of the shampoo I transmitted from the user terminal 2 as user use information, and analyzes the captured image.

FIG. 9 illustrates an analysis result of the filter management server 1. The analysis result of the filter management server 1 is displayed on the user terminal 2. Specifically, as a result of the image analysis and the sentence processing by the filter management server 1, ingredients of the shampoo I, the influence on the water quality, and the influence on the water treatment device 3 are displayed together with the captured image of the shampoo I. Therefore, since the user U can easily recognize what influence the shampoo I used in the shower booth 5 by himself or herself has, those displayed can be used as reference information when purchasing a shampoo used for hair wash.

FIG. 10 illustrates a specific example of advice from the service provider M displayed on the user terminal 2. Specifically, as the advice from the service provider M regarding the shampoo I illustrated in FIG. 6 described above, "You can get an advice. Please provide a data?" is displayed on the user terminal 2. That is, the user U is required to have advice from the service provider M regarding the shampoo I in use and to select whether or not to provide reference data. Here, when the user U performs an operation indicating that data is to be provided, data relevant to advice on the shampoo I is displayed from the service provider M side. Specifically, "Now 50 mL—Recommend 15 mL" is displayed on the user terminal 2. That is, as advice from the service provider M side, the shampoo I of 50 mL is currently used for one hair wash, but it is recommended to reduce this to 15 mL. Therefore, since the specific advice is presented from the service provider M side, the user U can suppress the influence on the water quality and the influence on the health by acting in accordance with the advice. As a result, it is possible to extend the replacement life of the filter 31.

As described above, the service provider M operates the water treatment device 3 using the algorithm input to the water management server 10, and updates the algorithm based on the analysis result of various kind of data acquired as analysis data. In addition, the service provider M provides an incentive to the user U who provides information or the user U who replaces the filter 31. Therefore, it is possible to improve the accuracy of the algorithm.

Figure 11:
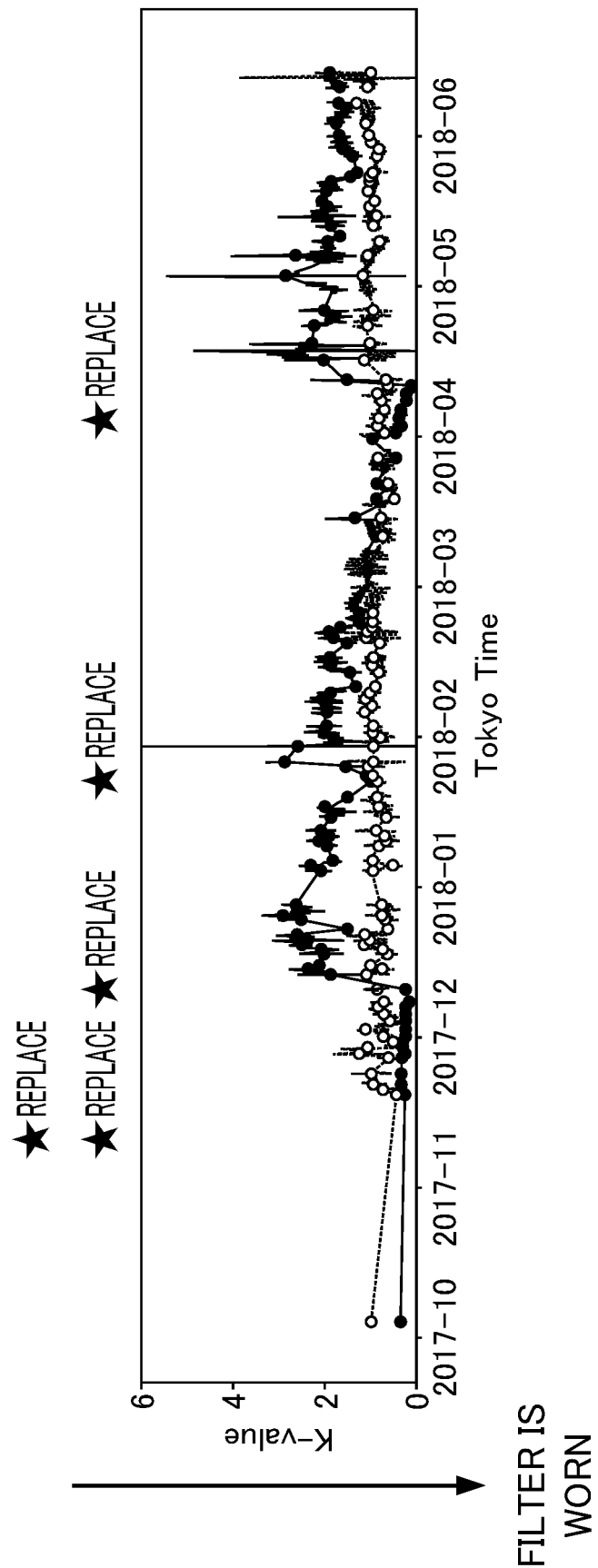
FIG. 11 is a graph that is generated based on analysis data and shows a relationship between the filter replacement timing and the capability of a filter.

Next, a specific example of the algorithm for operating the water treatment device 3 will be described with reference to FIGS. 11 and 12. FIG. 11 is a graph that is generated based on analysis data and shows a relationship between the replacement timing of the filter 31 and the capability of the filter 31.

The horizontal axis indicates time, and the vertical axis indicates the capability of the filter 31. Filter replacement is performed at the timing indicated as "★ replacement". As shown in FIG. 11, the capability of the filter 31 is improved in accordance with filter replacement.

Figure 12:
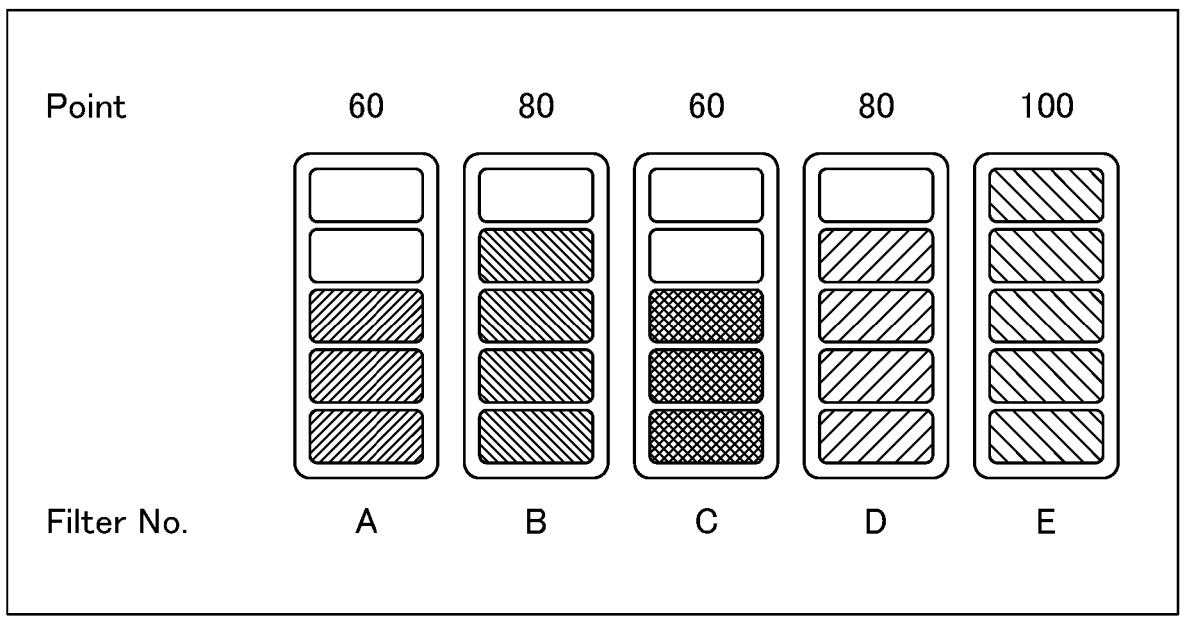
FIG. 12 is a diagram obtained by normalizing the capability of the filter illustrated in FIG. 11 and evaluating and visualizing the capabilities of five types of filters out of 100 points.

FIG. 12 is a diagram obtained by normalizing the capability of the filter 31 shown in FIG. 11 described above and evaluating and visualizing the capabilities of the five types of filters 31 out of 100 points.

As illustrated in FIG. 12, the current state of the filter 31 can be visualized by individually scoring the capability of the filter 31, so that the user U can grasp the replacement life of the filter 31 at a glance. Specifically, in the example illustrated in FIG. 12, among the filters 31, the capability of the filter 31 with the filter number [A] is 60 points, the capability of the filter 31 with the filter number [A] is 60 points, the capability of the filter 31 with the number [B] is 80 points, the capability of the filter 31 with the filter number

[C] is 60 points, the capability of the filter 31 with the filter number [D] is 80 points, and the capability of the filter 31 with the filter number [E] is 100 points. In this manner, an algorithm for estimating and detecting the degree of wear of the filter 31 can be derived from the graph of FIG. 11 and visualized as illustrated in FIG. 12.

The algorithm derived from the graph of FIG. 11 can be updated to a more sophisticated one by measuring the condition of the filter 31 and specifying the cause of wear of the filter 31. Specifically, the filter 31 collected for filter replacement is analyzed using the following method. That is, the surface properties of the collected filter 31 are observed by a microscope, a confocal microscope, an electron microscope, an atomic force microscope, a probe microscope, and the like. Then, substances adhering to the surface of the filter 31 are sampled and applied to an analyzer for gas chromatography, liquid chromatography, energy dispersive X-ray analysis, and the like to specify the cause of clogging of the filter 31 or substances clogging the filter 31. In addition, in order to evaluate the basic performance of the filter 31, the pressure and the flow rate are changed to calculate an accurate value of the degree of wear of the filter 31, and the basic removal performance and eluted materials are analyzed. In this manner, the condition of the filter 31 is accurately measured.

After the condition of the filter 31 is determined, a regeneration method or a storage method according to the cause of wear is selected. Regarding the regeneration method, for example, when the deposition of calcium-based materials on the filter 31 is the main cause, the condition of the filter 31 can be improved by washing the filter 31 with an acidic liquid, such as hydrochloric acid. In addition, when the deposition of protein on the filter 31 is the main cause, the condition of the filter 31 can be improved by dissolving the protein using an alkaline liquid represented by sodium hydroxide. Depending on the type or the condition of the filter 31, when it is determined that storage in water is appropriate, it is preferable to store the filter 31 in pure water, acrylic acid, aqueous sodium bisulfite solution, or the like.

As described above, by analyzing the cause or the state of clogging of the filter 31 in detail and combining the analysis result and the user use information, it is possible to extend the use time of treated water or to propose a configuration recommended as the configuration of the filter 31. As a result, it is possible to reduce the running cost borne by the user U.

Next, a flow until an incentive is provided from the service provider M to the user U who has provided analysis data or the user U who has replaced the filter 31 will be described with reference to FIG. 13.

Figure 13:
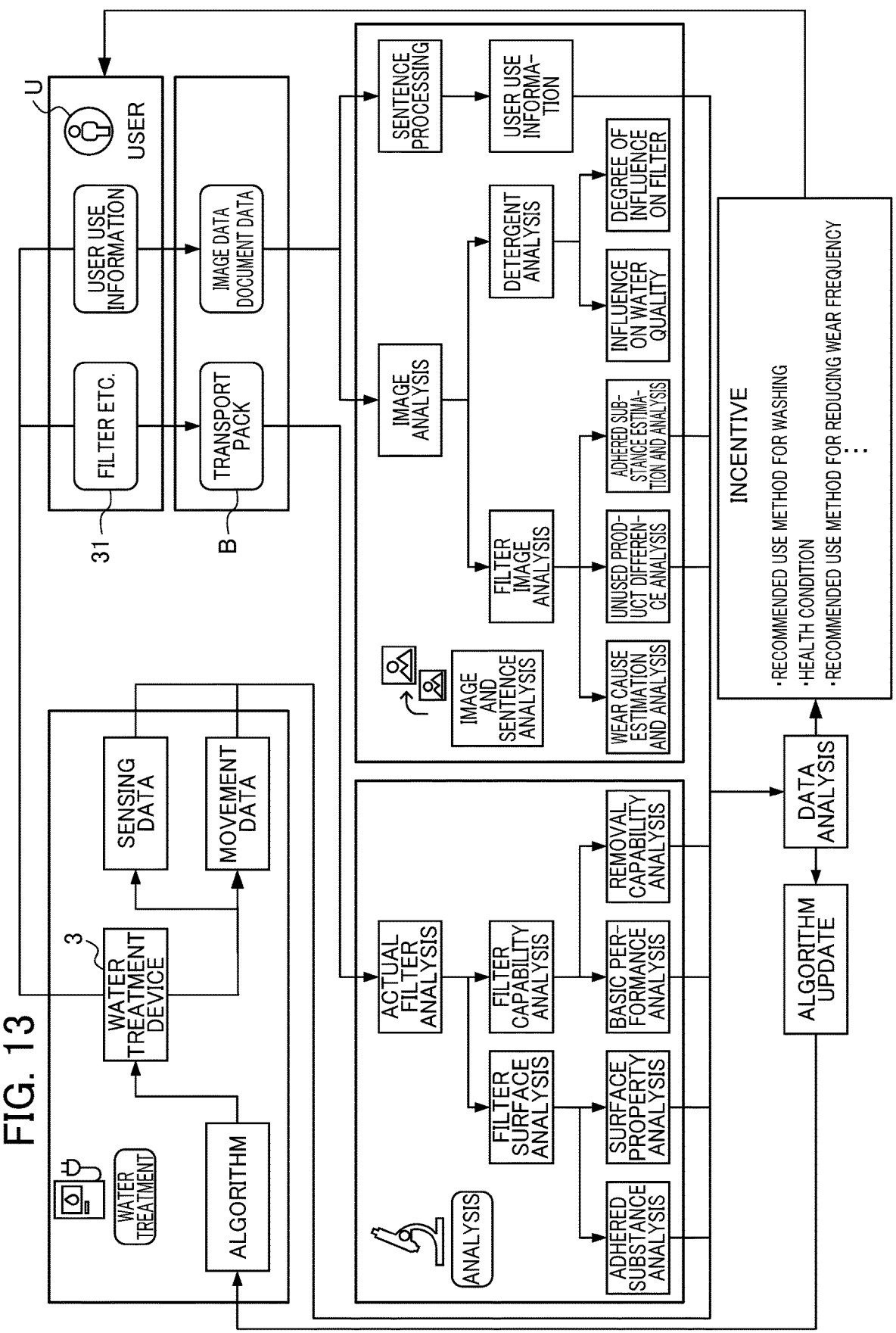
FIG. 13 is a diagram illustrating a flow until an incentive is provided from a service provider to a user.

FIG. 13 is a diagram illustrating a flow until an incentive is provided from the service provider M to the user U. As illustrated in the upper left of FIG. 13, among pieces of data output from the water treatment device 3 that performs water treatment, sensing data and operation data are used as analysis data as they are.

In addition, as illustrated in the upper left and upper right of FIG. 13, the filter 31 collected for replacement from the water treatment device 3 that performs water treatment and the collected sample water DW are packed into a transport pack and sent to the service provider M for analysis. In the analysis of the filter 31 (actual filter analysis), analysis of the surface of the filter (filter surface analysis) and analysis of the capability of the filter (filter capability analysis) are performed. Of these analyses, in the analysis of the surface of the filter (filter surface analysis), analysis of substances adhering to the filter 31 (adhered substance analysis) and analysis of the properties of the filter 31 (surface property analysis) are performed. In addition, in the analysis of the capability of the filter (filter capability analysis), analysis of the basic performance of the filter 31 (basic performance analysis) and analysis of the removal capability of the filter 31 (removal capability analysis) are performed. Information obtained as results of these analyses is used as data analysis information for data analysis.

In addition, as illustrated in the upper left and upper right of FIG. 13, user use information obtained from the water treatment device 3 that performs water treatment is subjected to image analysis and sentence processing as image data and document data, respectively. Of these, the sentence-processed sentence data is included in the analysis data as user use information. In addition, in the image analysis, analysis of a captured image of the filter 31 (filter image analysis) and analysis of a detergent used by the user U in the shower booth 5 (detergent analysis) are performed. In the analysis of the captured image of the filter 31 (filter image analysis), an analysis for estimating the cause of wear of the filter 31, an analysis based on comparison with the unused filter 31 (unused product difference analysis), and an analysis for estimating the cause of the adhesion of substances adhering to the filter 31 (adhered substance estimation and analysis) are performed. In addition, in the analysis of the detergent used by the user U in the shower booth 5 (detergent analysis), the influence on the water quality and the influence on the filter 31 are analyzed.

When the data is analyzed by the filter management server 1, the algorithm for operating the water treatment device 3 is updated based on the analysis result, and the updated algorithm is fed back to the water treatment device 3. In addition, based on the analysis result of the filter management server 1, for example, the following information is provided to the user U as an incentive. That is, a service that provides a recommended use method for washing the body (hair and the like) of the user U using a detergent, a service that provides information indicating the health condition of the user U, a service that provides a recommended use method for reducing the degree of wear of the filter 31, and the like are provided as incentives.

Although one embodiment of the present invention has been described above, the present invention is not limited to the above-described embodiment, and modifications, improvements, and the like within a range where the object of the present invention can be achieved are included in the present invention.

For example, in the embodiment described above, the number of filters 31 is three or five. However, this is merely an example, and the number of filters 31 may be any number other than three or five.

In addition, for example, in the embodiment described above, advice on the amount of shampoo I used by the user U is exemplified as an incentive provided to the user U. However, the present invention is not limited thereto. For example, the user U may be able to give advice on a recommended method for the body washing method.

In addition, for example, in the embodiment described above, the shampoo I is exemplified as an image analysis target. However, the present invention is not limited thereto. The degree of wear can also be determined by analyzing the captured image of the filter 31.

In addition, for example, in the embodiments described above, the operation by the user U is performed on the user terminal 2, but the present invention is not limited thereto. The operation may be performed on the touch panel 54 provided in the shower booth 5. That is, the user U can activate and operate the application program installed on the user terminal 2, or can operate a graphical user interface (GUI) displayed on the touch panel 54 provided in the shower booth 5.

In addition, for example, in the embodiment described above, the analysis result analyzing unit 104 has been described as mainly analyzing the performance of the filter. However, the present invention is not limited thereto. That is, the analysis result analyzing unit 104 can analyze not only the performance of the filter but also, for example, sample water. Then, since the algorithm is updated based on the analysis result of the sample water, more efficient drainage water treatment becomes possible. In addition, in this case, it is natural that the acquisition unit 101 acquires information necessary for analyzing the sample water in addition to information necessary for analyzing the performance of the filter.

In addition, for example, in the embodiment described above (mainly FIGS. 11 and 12), a specific example of the algorithm for operating the water treatment device 3 has been described. However, the water treatment device 3 does not need to be operated by a single algorithm, and it is also possible to operate the water treatment device 3 using a plurality of algorithms. For example, the server 1 can adopt an algorithm in which position information is acquired using a GPS or the like and the number of filters to be adopted is increased or decreased in consideration of the information.

In addition, for example, the above-described series of processes can be executed by hardware or can be executed by software. In other words, the functional configuration illustrated in FIG. 4 is merely an example, and is not particularly limited. That is, it is sufficient that the information processing system has a function capable of executing the above-described series of processes as a whole, and what kind of functional block is to be used to realize this function is not particularly limited to the example illustrated in FIG. 4. In addition, the location of the functional block is not particularly limited to FIG. 4 and may be arbitrary. In addition, one functional block may be configured by hardware alone, or may be configured by software alone, or may be configured by a combination thereof.

In addition, for example, when a series of processes are executed by software, a program configuring the software is installed on a computer or the like through a network or a recording medium. The computer may be a computer embedded in dedicated hardware. In addition, the computer may be a computer that can execute various functions by installing various programs, for example, not only a server but also a general-purpose smartphone or a personal computer.

In addition, for example, a recording medium containing such a program is not only a removable medium (not illustrated) distributed separately from the apparatus main body in order to provide the user with the program but also a recording medium provided to the user in a state in which the recording medium is built into the apparatus main body in advance.

In addition, in this specification, steps for describing a program recorded on a recording medium include not only processing performed on a time-series basis according to the order but also processing that is performed in parallel or individually even if the processing is not necessarily performed on a time-series basis. In addition, in the present specification, the term "system" means an entire apparatus including a plurality of devices or a plurality of units.

In summary, an information processing device to which the present invention is applied only needs to have the following configuration, and it is possible to take various embodiments. That is, an information processing device to which the present invention is applied (for example, the filter management server 1 illustrated in FIG. 1) is an information processing device for managing a water treatment system for treating drainage water using one or more filters (for example, the filter 31 illustrated in FIG. 2), and includes: an acquisition unit (for example, the acquisition unit 101 illustrated in FIG. 4) for acquiring information necessary for analyzing the performance of the one or more filters or sampled water (for example, the sample water DW); an analysis unit (for example, the analysis unit 102 illustrated in FIG. 4) for analyzing the one or more filters based on the information acquired by the acquisition unit; a first analysis unit (for example, the analysis result analyzing unit 104 illustrated in FIG. 4) for analyzing the one or more filters or the collected water based on the analysis result of the analysis unit; and an update unit (for example, the update unit 105 illustrated in FIG. 4) for updating an algorithm relevant to the water treatment based on the analysis result of the first analysis unit. Therefore, it is possible to appropriately generate or update the algorithm relevant to the water treatment purification system.

In addition, a second analysis unit (for example, the image etc. analysis unit 103 illustrated in FIG. 4) for analyzing images and sentences based on the information acquired by the acquisition unit can be further provided, and the first analysis unit can further analyze the analysis result of the second analysis unit. Therefore, it is possible to provide a technique for further promoting the collection of a used filter from the user and the provision of various kinds of information.

In addition, a providing unit (for example, the providing unit 106 illustrated in FIG. 4) for providing the user (for example, the user U illustrated in FIG. 1) of the water treatment system with an incentive for cooperation in disclosing the information necessary for analyzing the performance of the one or more filters or collecting a used filter necessary for generating the information based on the analysis result of the first analysis unit can be further provided. Therefore, by providing an incentive to the user of the water purification system, it is possible to provide a technique for promoting the cooperation of the user in collecting a used filter and providing various kinds of information.

In addition, a collection and analysis method to which the present invention is applied is a method for collecting and analyzing a filter used in a water purification system, and can include: receiving determination of wear of the filter by a water purification system; packing the used filter into a transport pack; transporting the transport pack; and analyzing the filter.

The method to which the present invention is applied is as follows: a method of collecting and analyzing a filter used in a water purification system and sending a feedback, and can include: receiving determination of wear of the filter by the water purification system; packing the used filter into a transport pack; transporting the transport pack; analyzing the filter; and providing a filter suitable for the use environment or use condition from the analysis result.

In addition, a method to which the present invention is applied is a method of collecting, analyzing, and regenerating a filter used in a water purification system, and can include: receiving determination of wear of the filter by the water purification system; packing the used filter into a transport pack; transporting the transport pack; analyzing the filter; determining a regeneration method from the analysis result; and regenerating the used filter using the regeneration method.

In addition, a method to which the present invention is applied is a method of collecting and storing a filter used in a water purification system, and can include: removing the filter from the water purification system; packing the used filter into a transport pack and transporting the transport pack; analyzing the filter and determining a storage method; and storing the used filter.

In addition, a method to which the present invention is applied is a method of providing an incentive to a user of a water purification system. By providing data of a detergent, which is used by a user, and an environment to a media collection point through media, an incentive can be provided for the data.

In addition, a method to which the present invention is applied is a method of notifying a user of water purification system of a recommended use method. By providing data of a detergent, which is used by a user, and an environment to a media collection point through media, it is possible to notify the user of the recommended use method.

In addition, a shower application to which the present invention is applied is a shower application using a water purification system, and it is possible to call a use environment registered in advance by a user.

EXPLANATION OF REFERENCE NUMERALS

1: server, 2, 2-1 to 2-$n$: user terminal, 3, 3-1 to 3-4: water treatment device, 4C, 4C-1 to 4C-4: treated water sensor, 4D, 4D-1 to 4D-4: drainage water sensor, 5, 5-1 to 5-4: shower booth, 11: CPU, 12: ROM, 13: RAM, 14: bus, 15: input and output interface, 16: output unit, 17: input unit, 18: storage unit, 19: communication unit, 20: drive, 30: removable medium, 31: filter, 32: drainage water treatment tank, 33: water storage tank, 51, 51-1 to 51-4: pump, 52, 52-1 to 52-4: valve, 53, 53-1 to 53-4: shower head, 54, 54-1 to 54-4: touch panel, 101: acquisition unit, 102: analysis unit, 103: analysis result analyzing unit, 104: image etc. analysis unit, 105: update unit, 106: providing unit, 401: analysis DB, W: water circulation management system, U, U1 to Un: user, WL: water passage, N: network, DW: sample water

The invention claimed is:

1. An information processing device for managing replacement of one or more filters for a water circulation management system equipped with a water passage that purifies water output from a water utilization unit using one or more filters and circulates treated water to the water utilization unit, the water circulation management system includes a treated water sensor that senses the treated water input to the water utilization unit and a drainage water sensor that senses drainage water output from the water utilization unit, the information processing device comprising: a processor coupled to a memory containing a database; a communication unit that controls communication with other devices through a network; and a display for displaying images, wherein the water utilization unit includes at least a shower booth, wherein the processor comprises functionality for: acquiring predetermined information necessary for analysis of each of performance of the one or more filters, collected water, and status of use by a user of the water utilization unit, the predetermined information includes information from the treated water sensor and the drainage water sensor; obtaining an analysis result by analyzing the one or more filters based on the predetermined information; obtaining a result of analysis by analyzing the performance of the one or more filters or the collected water based on the analysis result, wherein the one or more filters include multiple filters with different performance and/or capacity, and include a regenerated filter in which a regeneration method and a storage method capable of improving a condition of a used filter based on the analysis result and the result of analysis are selected and implemented, wherein the predetermined information includes information capable of obtaining analysis data for estimating and detecting the degree of wear of each of the multiple filters, the analysis data is stored in the database, wherein the processor further comprises a functionality for visualizing the current capabilities of each filter at the display by normalizing the capabilities of one or more filters based on the result of analysis and individually scoring the capabilities of the filters using a numerical score for each filter, and wherein the processor further comprises a functionality for updating an algorithm for controlling timing of replacement of the one or more filters and changing the configuration of the filter composed of the multiple filters, based on the analysis result, wherein the algorithm is based at least in part on position information corresponding to a position of the multiple filters related to the configuration of the filters, wherein the position information is acquired using a global positioning system (GPS) and/or using a use environment registered in advance by the user.

2. The information processing device according to claim 1,
wherein the processor further comprises an incentive provision functionality for providing predetermined relevant information that results in performing at least one of providing various kinds of information by a user, collecting the used filter by a user and the replacement of one or more filters by a user, necessary for disclosing or generating the predetermined information.

3. The information processing device according to claim 1,
wherein in the regeneration method and the storage method carried out on the used filter for the water circulation management system, a regeneration method by washing with an acidic or alkaline liquid is used depending on a type or a condition of the filter and a type of substances deposited on the filter.

4. The information processing device according to claim 1,
wherein in the regeneration method and the storage method carried out on the used filter for the water circulation management system, a storage method to store in liquid is used depending on a type or a condition of the filter.

5. The information processing device according to claim 1,
wherein the processor further comprises a functionality for analyzing images and sentences associated with the predetermined information for further analysis related to the result of analysis, the images and sentences relating to detergents that affect water quality used by the user using the water utilization unit.

6. A non-transitory computer readable medium storing a program for causing a computer to execute a control process, the computer being for controlling information processing for managing replacement of one or more filters for a water circulation management system equipped with a water passage that purifies water output from a water utilization unit using one or more filters and circulates treated water to the water utilization unit, the water circulation management system includes a treated water sensor that senses the treated water input to the water utilization unit and a drainage water sensor that senses drainage water output from the water utilization unit, wherein the water utilization unit includes at least a shower booth, the control process comprising: an acquisition step that comprises acquiring predetermined information necessary for analysis of each of performance of the one or more filters, collected water, and status of use by a user of the water utilization unit, the predetermined information includes information from the treated water sensor and the drainage water sensor; an analysis step that comprises analyzing the one or more filters based on the predetermined information acquired in the acquisition step; an analyzing step that comprises analyzing the performance of the one or more filters or the collected water based on an analysis result obtained by the analysis step, wherein the one or more filters include multiple filters with different performance and/or capacity, and include a regenerated filter in which a regeneration method and a storage method capable of improving a condition of a used filter based on the analysis result and the result of analysis are selected and implemented, wherein the predetermined information includes information capable of obtaining analysis data for estimating and detecting the degree of wear of each of the multiple filters, the analysis data is stored as a database, wherein the control process further comprises a displaying step that comprises visualizing the current capabilities of each filter by normalizing the capabilities of one or more filters based on a result of analysis obtained by the analyzing step and individually scoring the capabilities of the filters using a numerical score for each filter, and wherein the control process further comprises a step for updating an algorithm for controlling timing of replacement of the one or more filters and changing the configuration of the filter composed of the multiple filters, based on the analysis result, wherein the algorithm is based at least in part on position information corresponding to a position of the multiple filters related to the configuration of the filters, wherein the position information is acquired using a global positioning system (GPS) and/or using a use environment registered in advance by the user.

7. The non-transitory computer readable medium according to claim 6,
wherein the control process further comprises an incentive provision step for providing predetermined relevant information that results in performing at least one of providing various kinds of information by a user, collecting the used filter by a user and the replacement of one or more filters by a user, necessary for disclosing or generating the predetermined information.

8. The non-transitory computer readable medium according to claim 6,
wherein in the regeneration method and the storage method carried out on the used filter for the water circulation management system, a regeneration method by washing with an acidic or alkaline liquid is used depending on a type or a condition of the filter and a type of substances deposited on the filter.

9. The non-transitory computer readable medium according to claim 6,
wherein in the regeneration method and the storage method carried out on the used filter for the water circulation management system, a storage method to store in liquid is used depending on a type or a condition of the filter.

10. The non-transitory computer readable medium according to claim 6,
wherein the control process further comprises a step for analyzing images and sentences associated with the predetermined information for further analysis related to the result of analysis, the images and sentences relating to detergents that affect water quality used by the user using the water utilization unit.

11. An information processing method to be executed by an information processing device for managing replacement of one or more filters for a water circulation management system equipped with a water passage that purifies water output from a water utilization unit using one or more filters and circulates treated water to the water utilization unit, the water circulation management system includes a treated water sensor that senses the treated water input to the water utilization unit and a drainage water sensor that senses drainage water output from the water utilization unit, wherein the water utilization unit includes at least a shower booth, the information processing method comprising: an acquisition step that comprises acquiring predetermined information necessary for analysis of each of performance of the one or more filters, collected water, and status of use by a user of the water utilization unit, the predetermined information includes information from the treated water sensor and the drainage water sensor; an analysis step that comprises analyzing the one or more filters based on the predetermined information acquired by the acquisition step; an analyzing step that comprises analyzing the performance of the one or more filters or the collected water based on an analysis result obtained by the analysis step, wherein the one or more filters include multiple filters with different performance and/or capacity, and include a regenerated filter in which a regeneration method and a storage method capable of improving a condition of a used filter based on the analysis result and the result of analysis are selected and implemented, wherein the predetermined information includes information capable of obtaining analysis data for estimating and detecting the degree of wear of each of the multiple filters, the analysis data is stored as a database, wherein the information processing method further comprises a displaying step that comprises visualizing the current capabilities of each filter by normalizing the capabilities of one or more filters based on a result of analysis obtained by the analyzing step and individually scoring the capabilities of the filters using a numerical score for each filter, and wherein the information processing method further comprises a step for updating an algorithm for controlling timing of replacement of the one or more filters and changing the configuration of the filter composed of the multiple filters, based on the analysis result, wherein the algorithm is based at least in part on position information corresponding to a position of the multiple filters related to the configuration of the filters wherein the position information is acquired using a global positioning system (GPS) and/or using a use environment registered in advance by the user.

12. The information processing method according to claim 11, further comprising
an incentive provision step for providing predetermined relevant information that results in performing at least one of providing various kinds of information by a user, collecting the used filter by a user and the replacement of one or more filters by a user, necessary for disclosing or generating the predetermined information.

13. The information processing method according to claim 11,
wherein the analysis result obtained by the analysis step and the result of analysis obtained by the analyzing step, and individual scoring of capability of the filters are communicated over the network for optimization of control of a flow rate of the water passage in the water cycle management system and control over maintenance of filter purification function, including filter replacement timing.

14. The information processing method according to claim 11,
wherein in the regeneration method and the storage method carried out on the used filter for the water circulation management system, a regeneration method by washing with an acidic or alkaline liquid is used depending on a type or a condition of the filter and a type of substances deposited on the filter.

15. The information processing method according to claim 11,
wherein in the regeneration method and the storage method carried out on the used filter for the water circulation management system, a storage method to store in liquid is used depending on a type or a condition of the filter.

16. The information processing method according to claim 11,
wherein the information processing method further comprises a step for analyzing images and sentences associated with the predetermined information for further analysis related to the result of analysis, the images and sentences relating to detergents that affect water quality used by the user using the water utilization unit.

* * * * *